UNITED STATES PATENT OFFICE.

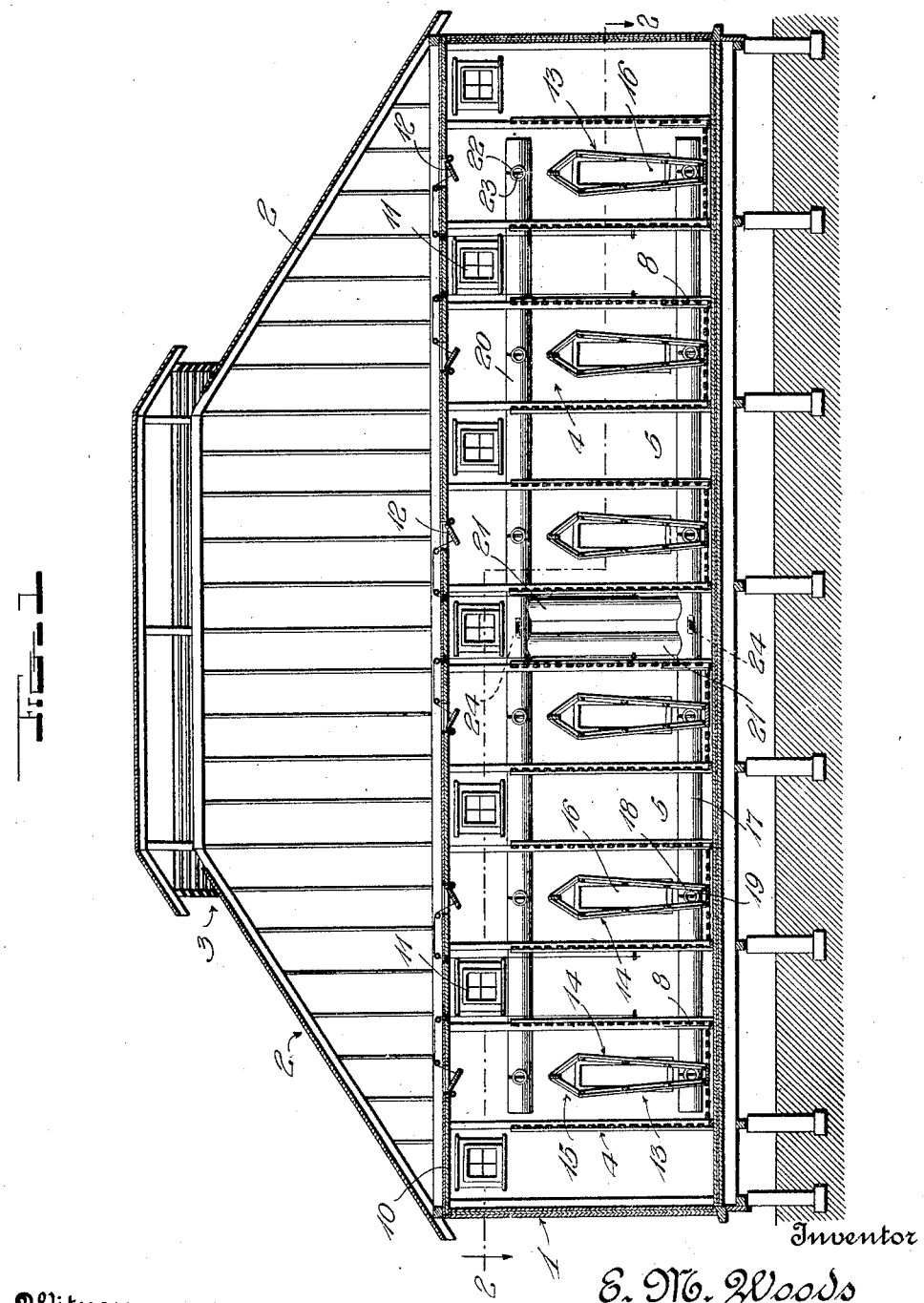

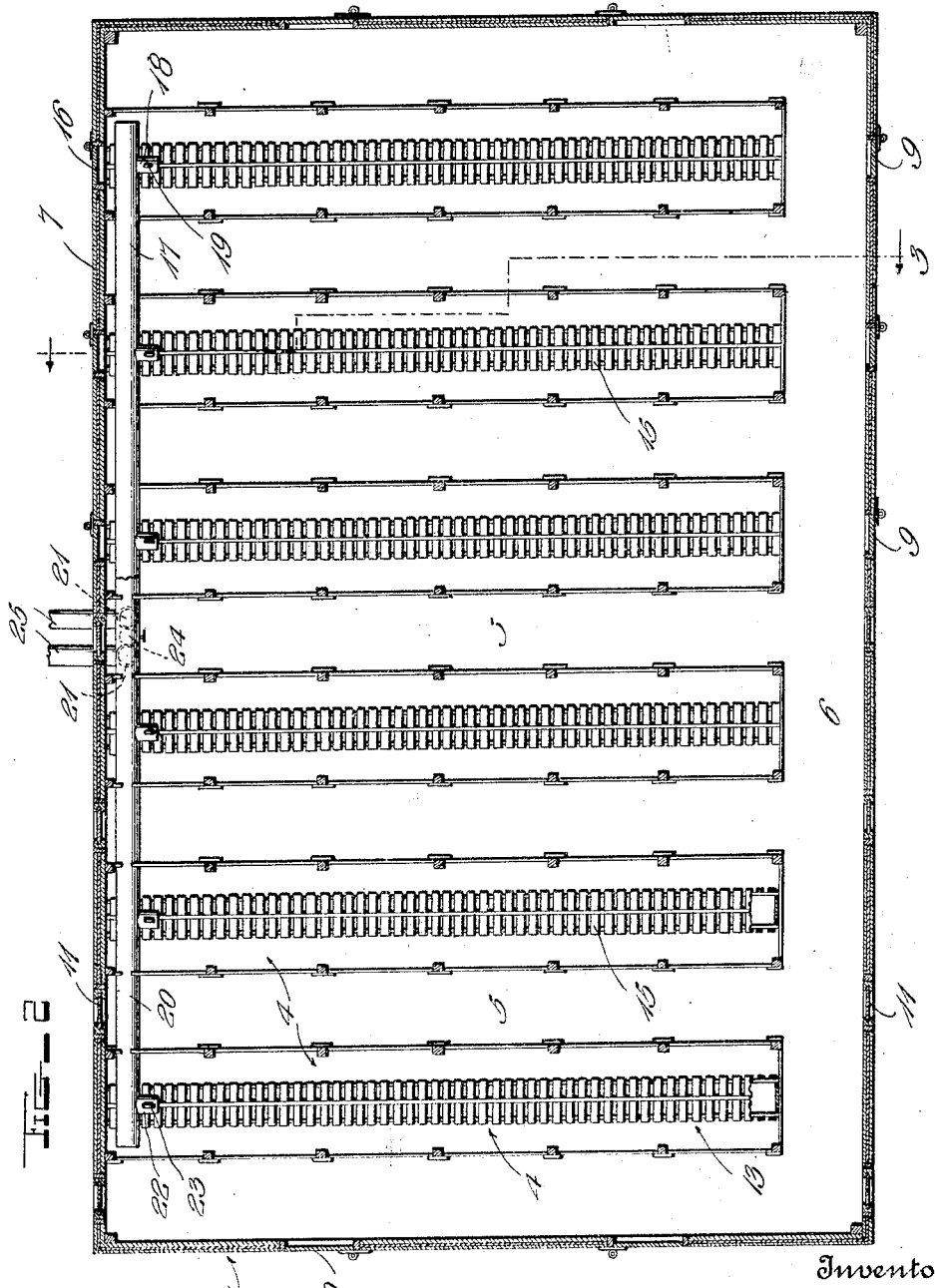

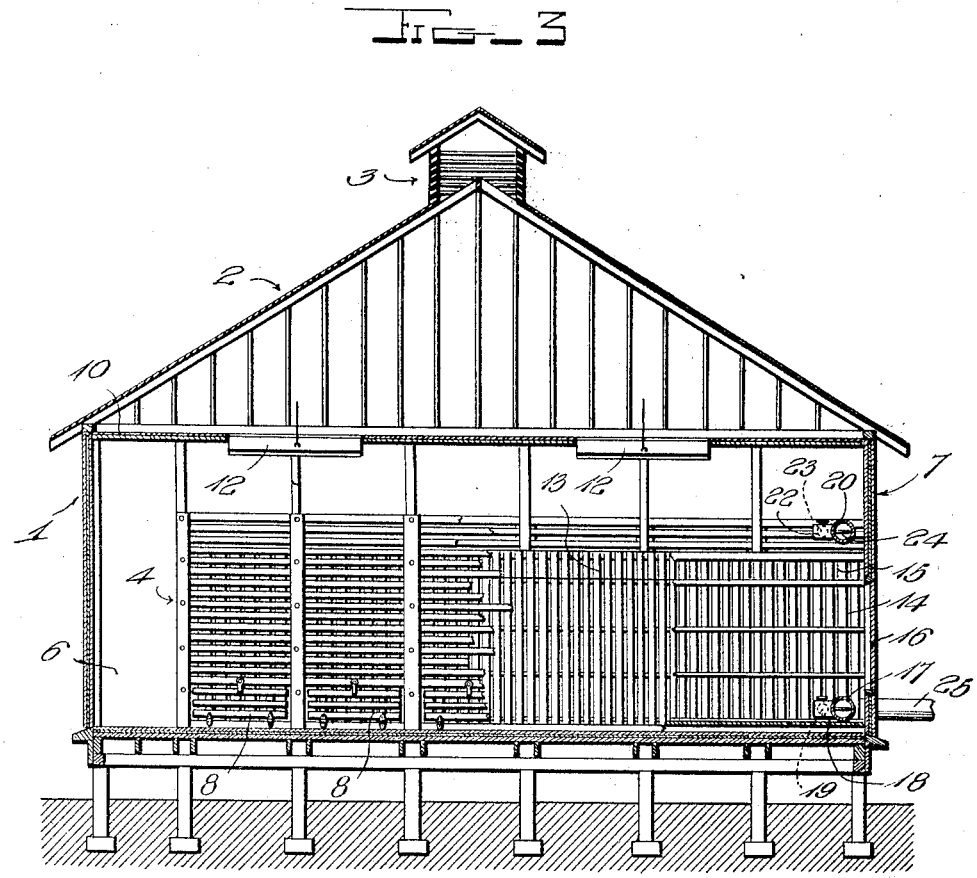
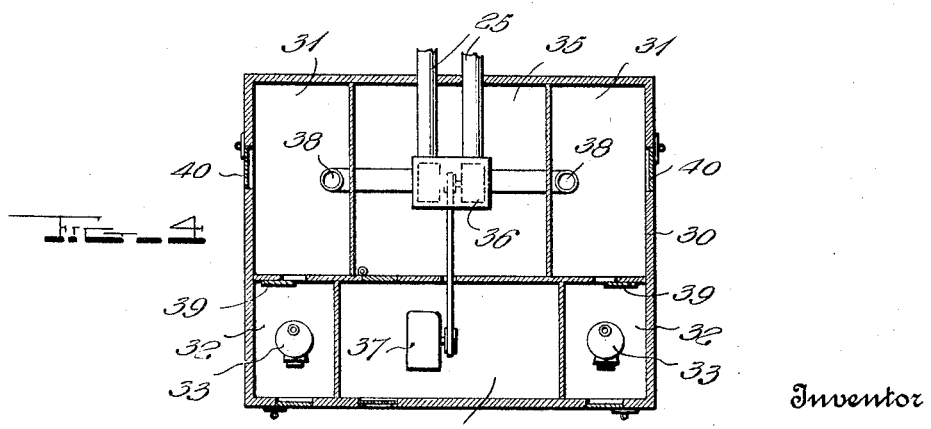

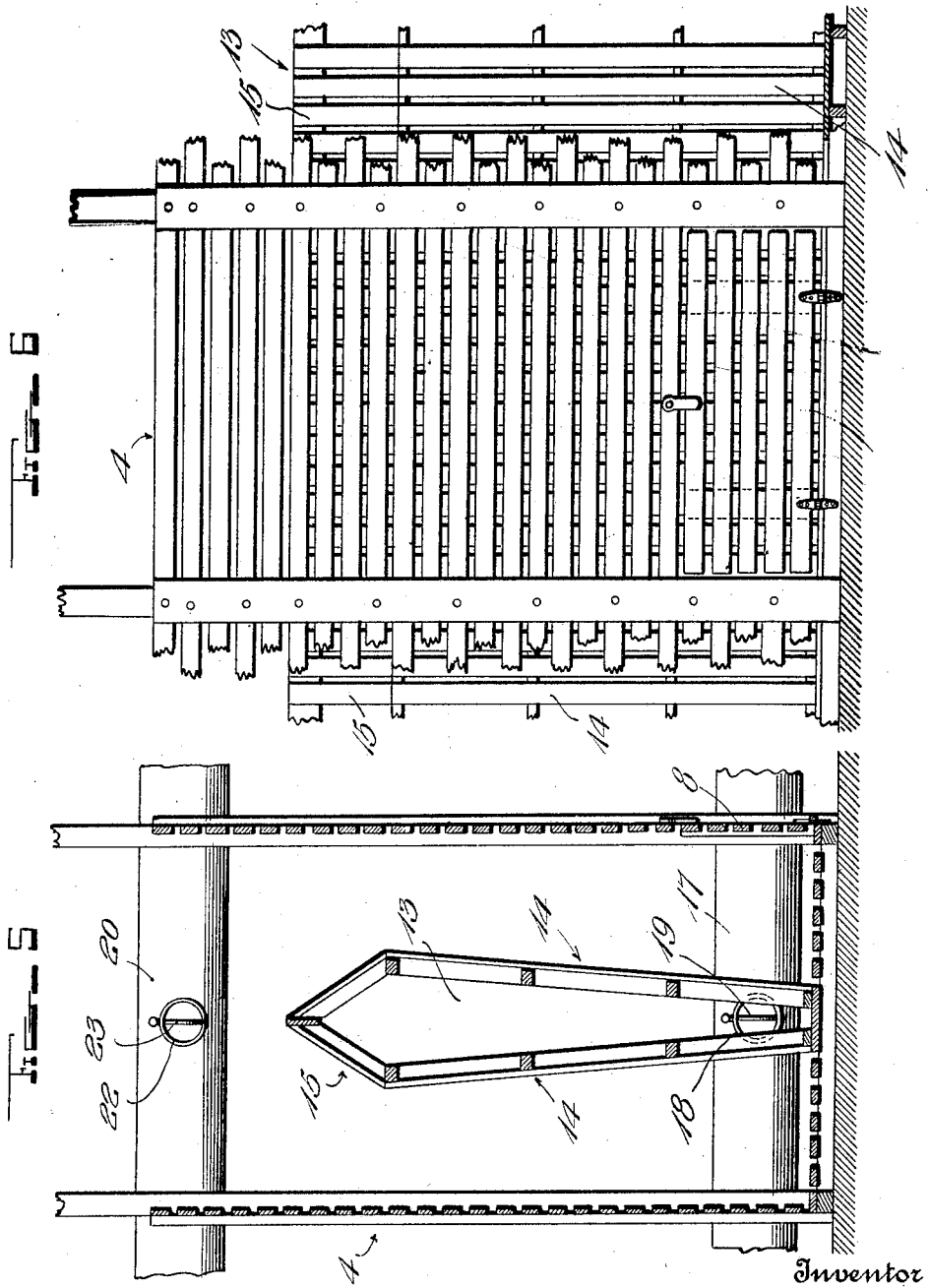

EDGAR MILES WOODS, OF GLADEWATER, TEXAS.

SWEET-POTATO-CURING HOUSE.

1,327,130.   Specification of Letters Patent.   Patented Jan. 6, 1920.

Application filed January 30, 1919. Serial No. 274,025.

*To all whom it may concern:*

Be it known that I, EDGAR M. WOODS, a citizen of the United States, residing at Gladewater, in the county of Gregg and State of Texas, have invented certain new and useful Improvements in Sweet-Potato-Curing Houses; and I do declare the following to be a full, clear, and exact description of the invention, such as will enable others skilled in the art to which it appertains to make and use the same.

My invention relates to houses for curing sweet potatoes and has for its principal object to provide a building of this character so constructed, heated and ventilated, as to prevent rotting of the potatoes, even though they may be more or less green or damp.

In carrying out the above object, further objects are to locate the sweet potato bins in a convenient manner and so as to allow ample circulation of air around them; to provide each bin with a hollow open work partition of novel construction, into which currents of air are forced to more effectively dry the potatoes; to provide for admitting atmospheric air into the partitions when the weather conditions permit; to devise a novel arrangement of heating pipes; and to provide means whereby warm air may be supplied to the entire interior of the building at the same temperature, or may travel to a part thereof at a greater or lower temperature than to the remainder.

With the foregoing in view, the invention resides in the novel arrangement and construction of parts hereinafter fully described and claimed, reference being made to the accompanying drawings which form a part of this application.

Figure 1 is a central, vertical, longitudinal section through a sweet potato curing house constructed in accordance with my invention.

Fig. 2 is a section through the walls of the building on the two horizontal planes indicated by line 2—2 of Fig. 1 to show the windows 11 and doors 16, all of the bins and partitions in the building being shown in top plan view.

Fig. 3 is a vertical transverse section taken on the three planes designated by the line 3—3 of Fig. 2.

Fig. 4 is a horizontal section of the building in which the air is heated and from which it is forced through the heating pipes of the curing house.

Fig. 5 is an enlarged sectional view cut longitudinally of the curing house, disclosing one of the bins and its hollow partition in transverse section.

Fig. 6 is a fragmentary side elevation of the bin and partition seen in Fig. 5.

In the drawing above briefly described, the numeral 1 designates a preferably elongated rectangular building having a suitable roof 2 provided with a slatted ventilator 3, the sides of the building and floor thereof being preferably of any appropriate weather proof construction. Within the building 1, a number of transverse slatted bins 4 are provided, transverse aisles 5 being provided between said bins while a longitudinal aisle 6 extends along one end thereof and communicates with the transverse aisles. The ends of the bins 4 remote from the aisle 6, abut one side wall 7 of the building 1, and with the exception of these ends, free circulation of air is permitted around the bins and over them. In addition to providing for the free circulation of air, the aisles 5 and 6 serve as passages for removing the potatoes as required, each bin being provided with a suitable number of hinged doors 8 which may be opened to allow the discharge of the potatoes into the aisles 5; and a suitable number of doors 9 may be provided at suitable points around the building for carrying out the potatoes and for entering the building to generally inspect the condition of its contents, as well as to regulate the dampers which control the supply of warm air. The upper portion of the building 1 immediately below the ceiling 10 is provided with appropriate windows 11 which admit sunlight and may be opened if required for ventilating purposes, and suitable trap doors or the like 12 are by preference provided in the ceiling 10 to allow the upward escape of the heated air, so that it may leave through the ventilator 3.

Located centrally in each of the bins 4 and extending approximately from end to end thereof, and from the bottom of the bin to a point spaced a slight distance below its top, is a hollow open-work partition 13 formed of slatted walls 14 diverging upwardly to a slight extent, and an arched, slatted top 15 extending from one wall 14 to the other. At the end of each partition 13, the side 7 is provided with a door 16 which may be opened when required to permit atmospheric air to enter the partition and thus circulate around the potatoes in the bin. A longitudinal hot air passage, shown in the form of a pipe 17, is provided at the inner side of the wall 7 and is equipped with lateral branches 18 discharging into the hollow partitions 13, adjacent the bottoms of the latter. A forced draft of heated air is discharged into each partition by means of its respective outlet 18 and such air will circulate around the potatoes in the bin 4 to assist in curing them. The amount of air discharged into the partitions may be regulated in any preferred manner as by the dampers 19 with which the outlets 18 are equipped.

Above the partitions 13, a second longitudinal hot air passage, preferably in the form of a pipe 20, is provided, said pipe communicating with pipe 17 through a pair of spaced vertical pipes 21 located at or near the centers of said pipes 20 and 17; and through suitable outlets 22, disposed one over each bin 4, drafts of heated air may be forced over the potatoes in the bins 4. Suitable dampers or the like 23 are provided for the outlets 22 so that the amount of air discharged may readily be controlled. As illustrated most clearly in Fig. 1, each pipe 17 and 20 is provided with a cut-off or damper 24 located between the pipes 21, and the damper of the pipe 17 is also positioned between two air inlet passages, shown in the form of pipes 25, which are adapted to conduct the heated air to the building. The two pipes 25, due to the construction yet to be described, may carry currents of air at different temperatures and when the cut-offs 24 are closed, the high temperature current will be supplied to one end of the pipes 20 and 17 while the low temperature current will travel to the other ends of said pipes. It will thus be seen that the two ends of the building may be heated at different temperatures, so that any green or damp potatoes in one end thereof may be readily dried without affecting the contents of the other end of the building. By means of the several dampers 19 and 23, the air may of course be projected in the greatest quantity wherever its use is most urgent.

An out building 30 is provided at a suitable point and is partitioned off to provide two hot air chambers 31, two stove rooms 32 in which stoves 33 are located, a motor room 34 and a fan room 35. In the fan room 35, a twin fan 36 is provided, said fan being driven in any preferred manner by a motor or the like 37 in the room 34. The pipes 25 communicate with the fan and the hot air is supplied to this fan through pipes or the like 38 which lead thereto from the hot air chambers 31. By means of sliding doors or the like 39, the heat from the stove rooms 32 is allowed to enter the chambers 31 in greater or less quantity, and by means of doors 40, atmospheric air may be admitted to such chambers when required. It will thus be seen that the temperature in one chamber 31 may be maintained at a lower degree than that in the other, or vice versa, and that the two chambers may be maintained at a uniform temperature when desired. If the chambers 31 are at the same temperature, the cut-off valves 24 remain open, and the currents of air from the pipes 25 will travel to both ends of the building 1 to heat them uniformly. If it is desired to heat one end of the building to a greater extent than the other, the valves 24 are closed, and the temperature of the proper chamber 31 is raised. It thus follows that hotter air will be supplied to the bins in which the green or damp potatoes are contained, the discharge being of course regulated by the several dampers 18 and 23.

By constructing the building in the manner shown and described, the potatoes may be effectively cured without loss, particular emphasis being laid upon the novel arrangement of aisles and bins, upon the hollow partitions in the bins, and upon the novel heating means. These several features are by preference in the relation and of the construction shown, but within the scope of the invention as claimed, numerous changes may well be made. Also, although I intend the invention primarily for curing sweet potatoes, it might well be used for curing other vegetables.

I claim:

1. In a vegetable curing plant, a building, a vegetable bin in said building occupying only a part of its interior to allow the circulation of air around said bin, an openwork hollow partition in said bin extending from end to end thereof, a passage discharging into one end of said partition, and means for supplying a forced current of air through said passage.

2. In a vegetable curing plant, a building, a vegetable bin in said building, a hollow partition in said bin formed of vertical openwork walls and arched openwork top extending from one wall to the other, said partition extending from end to end of said bin, a passage discharging into one end of said partition, and means for supplying a forced current of air through said passage.

3. In a vegetable curing plant, a building, a vegetable bin therein, a hollow openwork partition in said bin extending from end to end thereof, one end of said bin and partition abutting one side of said building and the remainder of the bin being spaced from the sides of the building, a door in said side of the building for allowing atmospheric air to enter said partition, a passage discharging into one end of said partition, and means for supplying a forced current of air through said passage.

4. In a vegetable curing plant, a building, a vegetable curing bin therein, a hollow openwork partition in said bin extending from end to end thereof, a passage for discharging a forced draft of heated air into one end of said hollow partition, adjacent the bottom of the bin, another passage for discharging a forced current of heated air into the building at the top of the bin, and means for creating the air currents.

5. In a vegetable curing plant, a building, a vegetable bin therein, a hollow openwork partition in said bin extending from end to end thereof, one end of said bin and partition abutting one side of said building and the remainder of the bin being spaced from the sides of the building, a door in said side of the building for allowing atmospheric air to enter said partition, a passage discharging into one end of said partition, adjacent the bottom thereof, for supplying a forced current of heated air, an additional heated air supply passage discharging into the building adjacent the top of the bin, and means for creating the air currents.

6. In a vegetable curing plant, a building, a plurality of parallel elongated bins in said building extending from one side thereof to points spaced from its opposite side, the spaces between said bins and at their ends forming aisles for filling the bins and ventilating them, a hollow openwork partition in each bin extending from end to end thereof, and means at said one side of the building for admitting a forced current of air into each partition.

7. A structure as specified in claim 6, together with doors in said one side of the building for admitting atmospheric air into said hollow partitions.

8. In a vegetable curing plant, a building, a plurality of transverse bins therein, aisles being provided between said bins and along one end thereof, the other ends of said bins extending to one side of the building, hollow openwork partitions in said bins extending from end to end thereof, said partition also extending to said side of the building, upper and lower air passages adjacent the tops and bottoms of the bins and located at one end thereof, said passages having outlets for each bin, the outlets of the lower passage discharging into one end of said partitions, and means for forcing air through said passages.

9. A structure as specified in claim 8, together with doors in said side of the building for admitting atmospheric air into said hollow partitions.

10. The combination with a vegetable drying house having hot air conducting means leading to different parts of the building; of a plurality of hot air chambers, means for heating the air in said chambers to the same or different temperatures, means for drawing separate currents of air from said chambers and forcing them into and through said hot air conducting means, and means whereby the several currents of air may be either segregated in said conducting means for passage to different parts of the house, or allowed to mix in said conducting means.

11. The combination with a vegetable curing house, and a conducting passage for supplying hot air to different parts of said house; of a pair of hot air chambers, means for heating the air in said chambers to either the same or different temperatures, a pair of passages discharging into said conducting passage at spaced points, means for drawing two separate currents of air from said chambers and forcing them through said two passages, respectively, and a cut-off in said conducting passage for segregating the two currents of air therein for passage to different parts of the house, or for allowing mixing of such currents.

12. The combination with a vegetable curing house having a passage for conducting hot air to different parts of the house, of a pair of passages discharging into said conducting passage at spaced points, means for supplying heated air at different temperatures to said pair of passages and for forcing the two currents of air therethrough into said conducting passage, and a cut-off in said conducting passage between the passages of said pair for either segregating the two currents of heated air for passage to different parts of the house or for allowing such currents to mix in said conducting passage.

In testimony whereof I have hereunto set my hand.

EDGAR MILES WOODS.